United States Patent Office 3,285,777
Patented Nov. 15, 1966

3,285,777
OXYGENIZING SYSTEMS USEFUL FOR
CLEANING PURPOSES
Henry Kahn, Grafton, and Lazar Popa, Sheffield Lake, Ohio, assignors to Goodrich-Gulf Chemicals, Inc., Cleveland, Ohio, a corporation of Delaware
No Drawing. Filed Dec. 23, 1963, Ser. No. 332,874
2 Claims. (Cl. 134—2)

This invention relates to the removal of undesirable contaminants from processing equipment; more particularly, however, this invention relates to a method of subjecting contaminating deposits formed in chemical processing equipment to the decomposition products of catalyzed hydroperoxide systems, thereby converting the deposits to an easily solubilized form and facilitating their removal.

Processes of every type and description are commonly carried out in large, stirred vessels, frequently provided with auxiliary equipment such as heat transfer coils, which enable heat to be supplied or extracted from the contents of the vessels. Such processes, whether carried on in a batch or in a continuous manner, in many cases eventually produce undesirable deposits on the surfaces of the equipment with which the reaction mixtures related to such processes come in contact. In addition to interfering with the efficient transfer of heat to and from the interior of the vessels, the unwanted deposits often have a tendency to deteriorate and partially fragment, resulting in contamination of the reaction mixtures and the products produced therein.

The above-described problem is particularly prevalent in chemical processes, especially in polymerization-type reactions. As is well known, monomeric materials capable of the reaction are commonly polymerized to form a variety of products possessing a host of valuable characteristics. Seemingly inherent in many polymerization reactions, however, is the formation of tough, gel-like films and other deposits on the interior surfaces of the equipment employed in carrying out such reactions. The films, which can be composed of the polymeric product itself or associated gel-like substances frequently formed during the course of such polymerizations, oftentimes are relatively insoluble in known solvents, and are of a type which cling tenaciously to the surfaces on which they have been deposited. Unfortunately, such phenomonon is often observed in the formation of stereoregular polymers produced with Ziegler-type organometallic catalysts, and coatings so generated are extremely difficult to remove. It is not uncommon to discover that desposits must be manually cut from the walls and other surfaces of the process equipment, or dislodged with the aid of rotary steel brushes. Not only are such methods laborious, time consuming and expensive, but in addition, the areas to be cleaned are frequently relatively inaccessible and, consequently, may not be conveniently cleaned by the foregoing methods. A process by which such processing equipment could be easily cleaned would, therefore, be of great economic advantage in the chemical processing industries, particularly in polymerization reactions of the type described.

Now a method has been found by which processing equipment may be readily cleaned. The process discovered is particularly adapted to the removal of adherent deposits formed in the course of polymerization reactions. The method of the invention, while making possible a highly efficient removal of undesirable films and similar deposits from the interior surfaces of polymerization and other equipment, greatly minimizes the risk of damage to such equipment which can occur in the course of ordinary cleaning operations. The process disclosed can readily be carried out, and greatly facilitates the cleaning of surfaces relatively inaccessible to various other cleaning methods. In many instances, the removal of the unwanted deposits may be achieved without manual assistance from remote locations. Furthermore, the components used in carrying out the cleaning operation are readily obtained and relatively inexpensive.

In accordance with this invention, a process for cleaning processing equipment is provided which comprises the steps of contacting the fouled areas of the equipment to be cleaned with a mixture which includes an organic solvent, an organic hydroperoxide and a metallic decomposition catalyst, and heating the combination until the contaminating deposits have been substantially dissolved.

In carrying out the process of the invention, the surfaces of the equipment to be cleaned are exposed to the solubilizing action of the cleaning mixture, commonly by filling the equipment with the mixture, until substantially all contaminating deposits have been dissolved. The mixture is compounded to contain an organic solvent, preferably substantially inert with respect to the other ingredients of the mixture, an organic hydroperoxide and a metallic decomposition catalyst. The decomposition catalyst produces what may be considered as a controlled decomposition of the organic hydroperoxide, releasing decomposition products, including free radicals, to attack and substantially convert the contaminating deposits to form a soluble in the cleaning mixture. Ordinarily heat is applied to the mixture during the cleaning process in order to promote the catalytic decomposition of the hydroperoxide, and in addition, the cleaning mixture is advantageously continuously agitated. The treatment is continued until the desired degree of solubilization of contaminants has been achieved, after which the cleaning mixture is removed from the processing equipment, leaving the latter in a cleaned condition, ready for reuse.

The process of the invention finds utility in the protection of any equipment in which a reaction having organic deposits forming propensities is carried out. The reaction is particularly adapted, however, to the protection of equipment in which polymerization reactions are conducted. Among polymerizations which can result in deposits which it is ultimately desirable to remove may be mentioned, for example, the polymerization of cyclopentadiene to form polycyclopentadiene, the polymerization of monomeric vinyl chloride to produce polyvinyl chloride and similar reactions. The process has been found to be of special benefit in removing the build-up, frequently deposited in the form of a film, which occurs in the preparation of unsaturated polymers, particularly unsaturated stereoregular polymers, such as, cis-1,4-polybutadiene, cis-1,4-polyisoprene and the like produced by means of Ziegler organometallic type catalysts.

The actual mechanism by which the hydroperoxide catalyst constituents of the cleaning mixture assist in accomplishing the solubilization of the unwanted deposits is not clearly understood. However, the catalyst appears to cause decomposition of the hydroperoxide into oxygen-containing, free radical components which in turn attack the contaminants, modifying them to the desired soluble form. The catalyst constituents may also, however, perform some additional function in producing the cleaning action obtained. Irrespective of the mechanism involved, the cleaning mixture rapidly changes the solubility characteristics of the contaminants, and ultimately produces their substantial solution.

The solvent employed serves both as the liquid medium wherein the hydroperoxide and decomposition catalyst contact each other to form the deposit-modifying substances, as well as the solvent which dissolves the deposits in their modified form. Any organic solvent liquid, substantially unreactive with the hydroperoxide component of the system, which substantially dissolves the organic hydroperoxide and the decomposition catalyst, is satisfactory for the purposes of the invention. Among operable materials may be mentioned aliphatic, alicyclic and aromatic compounds, as well as complex combinations of them, including specifically materials such as, for instance, heptane, toluene, benzene, kerosene and many other solvents.

The hydroperoxide constituents suitable for the cleaning process have the general formula R—C—O—O—H in which R can be any organic radical such as, for example, alkyl, aryl or arylalkyl radicals. Among suitable compounds may be mentioned paramenthane hydroperoxide, cumene hydroperoxide, diisopropylbenzene hydroperoxide, tertiary butylhydroperoxide, and the like. Cumene hydroperoxide has, however, been found to give particularly satisfactory results, producing thoroughly cleaned surfaces in relatively short periods of time, and is, consequently, employed in the preferred embodiment of the invention.

Besides having at least some solubility in the solvent medium, the catalyst component should be of a type capable of yielding a controlled decomposition of the hydroperoxide employed. By controlled decomposition is meant that the catalyst is able to produce a gradual production of the decomposition products necessary for modification of the deposits to a form which can be readily dissolved by the solvent constituent of the mixture. Although some metals in the form of their soluble salts or complexes can produce decomposition of the hydroperoxide compound, peculiarly, many other metals seemingly have little, if any, ability to produce the necessary decomposition. Even more unexpected was the discovery that of the metals capable of decomposing the hydroperoxides, only a few give the controlled decomposition necessary to produce the continuing presence of the needed hydroperoxide decomposition products. Some metals, for example, produce an extremely rapid effect on the hydroperoxides, and in addition to being hazardous, are almost completely ineffective in accomplishing solution of the deposits. It has been determined, however, that the contact of the selected hydroperoxide compound with iron, vanadium or chromium containing substances results in a relatively sustained release of decomposition products, capable of promoting modification of the contaminating deposits to the desirable, substantially soluble form. Many different salts and complexes of the aforementioned metals can be employed to obtain the necessary decomposition reaction including salts of the metals with organic and inorganic acids, acetylacetonates, as well as others; specifically may be mentioned compounds such as, for example, ferric octoate, ferric naphthenate, ferric oleate, ferric chloride, vanadium acetylacetonate, tri-normal butyl vanadate, di-normal butyl monochlorovanadate, chromium triacetylacetonate, chromium trioxide and the like. In view of their unusual ability, even in small amounts, to catalyze decomposition of the hydroperoxides, the use of iron salts is especially desirable in accomplishing the cleaning techniques described.

In carrying out the invention, the order of addition of the components of the cleaning mixture is not particularly important. It has, however, been found convenient initially to add inert solvent, followed by the organic hydroperoxide and the decomposition catalyst, in that order. Additional solvent may then be added, if desired, where necessary to fill the apparatus. As indicated, a different order of addition can be employed if preferred.

It will be found that at least about 3 to 4%, by weight, of the hydroperoxide compound, based on the total weight of the cleaning mixture present, should be used if rapid and thorough solution of the unwanted deposits is to be achieved. One may, of course, use much larger amounts; however, concentrations in excess of about 20% are normally avoided, among other things, for reasons of safety. Particularly desirable cleaning is obtained when provision is made for addition of from about 6 to 8%, by weight, of the hydroperoxide.

Advantageously, a sufficient amount of the cleaning solution is employed so that the deposit contaminated surfaces of the equipment are covered by the solution. In most instances, it will be determined to be of advantage to heat the solution, preferably with agitation, so that a more useful rate of decomposition is realized. Although, it is normally desirable to heat the solution to as high a temperature as possible because of the beneficial effect on solution of the converted deposits, if the temperature is controlled at too high a level, the hydroperoxide decomposition will often proceed at a rate too rapid to produce optimum modification of the deposits to the soluble form. It will be appreciated that the best temperature for the prupose will vary depending on the peroxide and catalyst system chosen. In general, however, and particularly with systems employing, for example, cumene hydroperoxide and an iron salt in the presence of an aromatic solvent, adjustment of the temperature to from about 70 to 90° C. is satisfactory, and control at the reflux temperature of the system is particularly convenient.

In cases where the equipment to be cleaned is equipped with provision for heating, the heat necessary to adjust the cleaning solution to the required temperature can be readily supplied by such means. Alternatively, and also convenient, is provision for recycling the solution from the equipment, through a heat exchanger and back, at the control temperature, to the equipment.

It will be found that the amount of time required for satisfactory cleaning will depend upon various factors among which may be mentioned, for example, the nature of the cleaning system used, the temperature at which the process is carried out, the amount of contaminating deposits present, their particular nature, and like considerations. Complete removal of deposits has been achieved in as little as 48 hours, although in particularly difficult cases, as many as six days has been required. Periodic inspection of the equipment provides an easy way to determine the duration of treatment which will be necessary in a particular case.

If desired, from time to time during the cleaning process, additional amounts of either the hydroperoxide, the catalyst, or both, may be added to the system to accelerate the cleaning process. Such additions serve to replace reagents exhausted in the cleaning process and are sometimes advantageous.

Following cleaning of the equipment, the cleaning mixture, which is substantially all liquid, may be removed and stored for reuse in subsequent cleaning operations after adjustment of the hydroperoxide and catalyst content.

The following examples, while not to be construed as limiting the invention to the embodiments disclosed, are illustrative of the process.

*Example I*

In this example, to a one liter flask equipped with a heating mantle and provision for agitation, are added 500 cc. of benzene, a sample of polymeric gel, paramenthane hydroperoxide and ferric chloride. The gel sample used is that obtained from a polymerization vessel which has been coated with a gel-like deposit during the polymerization of butadiene in the presence of a Ziegler catalyst, i.e., an organoaluminum compound in combination with a cobalt compound. The relative amounts of the materials are adjusted so that on a weight percent basis, the mixture initially consists of 92.3% benzene, 5% gel, 2.5% paramenthane hydroperoxide, and 0.17% ferric chloride.

The temperature of the mixture is adjusted to about 80° C., and the mixture is agitated at that point during a period of about 70 hours. At the end of such time, almost all the gel is seen to have been dissolved, indicating that the process could be effectively employed to clean the interior of the polymerization vessel from which the gel sample was obtained.

Example II

In another experiment, conducted in equipment identical to that of Experiment I, a mixture is prepared consisting initially of 500 cc. of benzene, equivalent to 84.8 wt. percent of the total mixture, 10% paramenthane hydroperoxide and 0.16% ferric octoate. A sample of polymeric gel constituting 5% by weight of the whole is also introduced.

Again, the temperature is adjusted to 80° C., and the solution continuously agitated, this time for a period of 96 hours. The treatment accomplishes complete solution of the gel, although requiring somewhat more time than in the case of the previous experiment.

Example III

In a large scale experiment, a fifty-gallon, stirred polymerization reactor is run for seven weeks employing a polymerization reaction mixture substantially as described in Example I. At the end of the period, the polymerization is discontinued, and the reactor is discovered to contain a heavy coating of a tough, gel-like polymer.

During the cleaning cycle, the reactor is partially filled with benzene, and paramenthane hydroperoxide and ferric chloride are introduced. Additional benzene is subsequently added so that the reactor is completely filled. In the cleaning solution as initially constituted, the paramenthane hydroperoxide constitutes 10% by wt. of the reactor's contents while the ferric chloride present amounts to about 0.055%.

Following addition of the cleaning mixture to the reactor, the temperature in the jacket of the vessel is adjusted so that the contents are maintained at about 80° C. Agitation is continued for a period of 24 hours, at which time the cleaning mixture is removed from the vessel and its interior surfaces inspected. The treatment is found to have almost completely dissolved the gel coating, and in its cleaned condition, the reactor is, without further preparation, ready for continuation of the polymerization reaction.

Example IV

In another experiment, the method of the invention is used to clean a polymerization reactor of the type shown in Example III which has become contaminated following a polymerization reaction similar to that of Example III, but of two weeks duration.

In the experiment, the reactor, which again is heavily coated on its interior surfaces with a highly cross-linked ploymeric film, is partially filled with benzene, and cumene hydroperoxide and ferric octoate are added, in that order. The remaining free-space in the reactor is thereafter completely filled with additional benzene to insure contact of the cleaning solution with all contaminated surfaces. The amounts of cumene hydroperoxide and ferric octoate added correspond to 8.93% by wt., based on the weight of the entire cleaning solution, and 0.075% respectively.

The jacket of the reactor is employed to heat the contents of the reactor to 80° C. where the mixture is maintained, under agitation, for approximately 120 hours. At the conclusion of such time, analysis shows the hydroperoxide content to have decreased to a value of 5%; however, at this point the gel deposits have almost entirely been dissolved, and the equipment is in condition for immediate service.

Example V

In another experiment, conducted in an apparatus substantially identical to that disclosed in Example I, 500 milliliters of benzene are combined with approximately 10 grams of a coagulum deposit removed from a butadiene-styrene polymerization vessel. Vanadium acetylacetonate and cumene hydroperoxide are also added in quantities sufficient to initially comprise about 8%, by weight, based on the total weight of cleaning mixture present, and about 0.125%, respectively. The mixture is heated to 80° C. where it is maintained with agitation for a period of almost 24 hours. At the end of such time, the sample of coagulum is substantially totally dissolved, indicating application of the invention to organic unsaturated polymeric deposits generally.

Example VI

In a still further experiment, a one liter stirred flask is filled with 500 cc. of kerosene, and a 10 gram sample of gelled polymer of the type described in Example I is added. Also introduced are cumene hydroperoxide and ferric octoate in the amounts necessary to assure an initial concentration of hydroperoxide of about 6.13% by weight, based on the total weight of cleaning mixture present, and of about 0.075%, by weight, of the iron compound.

Following preparation, the contents of the flask are heated to 80° C. and maintained at that temperature, with agitation, for 24 hours, after which time, the sample of gel is observed to have been substantially dissolved.

Example VII

In an additional experiment, the cleaning system of the invention is tested in a procedure which includes the addition to a 250 milliliter flask, maintained under a nitrogen atmosphere, of 20 milliliters of benzene, 5 milliliters of paramenthane hydroperoxide and 0.001 gram of chromium trioxide. The catalyst component is introduced through the addition of 1/10 cc. of a solution consisting of 1/10 gram of the trioxide dissolved in a mixture of 1 cc. of water and 9 cc. of methanol.

Approximately 0.15 gram of polybutadiene which has been partially cured with peroxide to simulate gel contaminants frequently encountered in polymerization vessels, is placed in the cleaning mixture, and the contents are heated to the reflux temperature of the system, i.e., 82 to 85° C.

At the end of a 5½ hour period, the system shows no trace of solid polymer left, from which it is concluded that the process can be used to obtain satisfactory cleaning of large vessels contaminated with similar polymeric deposits. Judging from the results obtained, the presence or absence of air in the cleaning systems described appears to have little or no effect in the results obtained.

Example VIII

In a further experiment, the action of an organic hydroperoxide, by itself, on gel is examined by charging a one-quart polymerization bottle with 500 cc. of a 10%, by weight, solution of cumene-hydroperoxide in benzene. Approximately 5 grams of a gelled cis-1,4-polybutadiene sample are added to the bottle, after which the bottle and its contents are heated to 50° C. and agitated for 16 hours.

Following the treatment described, the contents of the bottle are examined, and although made transparent by the treatment, the sample does not appear to have been appreciably dissolved. The experiment clearly demonstrates the necessary and beneficial effect of the presence of the decomposition catalyst on gel removal.

What is claimed is:
1. A process for removing contaminants consisting of films and deposits formed in chemical processing equipment during polymerization reactions employed in the manufacture of organic polymers, comprising contacting the surfaces of the equipment to be cleaned with a mixture comprising (1) an organic hydroperoxide of the formula RCOOH wherein R is an alkyl, aryl or arylalkyl radical; (2) a metallic decomposition catalyst selected from the group consisting of salts and complexes of iron, vanadium or chromium; and (3) a substantially inert organic solvent having substantial solubility for said organic hydroperoxide and said metallic decomposition catalyst, said organic hydroperoxide constituting at least about 3% by weight of the mixture of said organic solvent, metallic decomposition catalyst, and organic hydroperoxide, and said metallic decomposition catalyst constituting at least about 0.025% by weight of said mixture, and heating the mixture until said contaminants have been substantially dissolved.

2. A process for removing contaminants consisting of films and deposits formed in chemical processing equipment during polymerization reactions employed in the manufacture of cis-1,4-polybutadiene comprising contacting surfaces of the equipment to be cleaned with a mixture comprising (1) cumene hydroperoxide; (2) an iron salt selected from the group consisting of ferric chloride and ferric octoate; and (3) a substantially inert organic solvent having substantial solubility for said cumene hydroperoxide and said iron salt, the concentration of said cumene hydroperoxide being at least about 3% by weight of the mixture of said cumene hydroperoxide, iron salt, and organic solvent, and the concentration of said iron salt being at least about 0.025% by weight of said mixture, heating the mixture until said contaminants have been substantially dissolved, and thereafter removing the dissolved contaminants.

References Cited by the Examiner
UNITED STATES PATENTS

| | | | |
|---|---|---|---|
| 2,607,753 | 8/1952 | Adams | 260—94.7 X |
| 2,614,100 | 10/1952 | Uraneck et al. | 252—186 X |
| 2,708,664 | 5/1955 | Jones | 260—94.7 X |
| 2,749,313 | 6/1956 | Williams et al. | 134—38 X |
| 2,810,665 | 10/1957 | Szayna | 134—22 X |
| 2,830,976 | 4/1958 | Kennedy et al. | 260—94.7 X |
| 2,880,121 | 3/1959 | Thompson | 134—38 X |
| 2,914,376 | 11/1959 | Bibolet et al. | 264—184 X |

MORRIS O. WOLK, *Primary Examiner.*

J. T. ZATARGA, *Assistant Examiner.*